(12) United States Patent
Yasue et al.

(10) Patent No.: US 10,850,438 B2
(45) Date of Patent: Dec. 1, 2020

(54) INJECTION DEVICE PROVIDED WITH FLOW PATH SWITCHING BLOCK

(71) Applicant: THE JAPAN STEEL WORKS, LTD., Tokyo (JP)

(72) Inventors: Akira Yasue, Hiroshima (JP);
Masahiko Taketani, Hiroshima (JP);
Kazuya Tsuji, Hiroshima (JP); Shigeki Inoue, Hiroshima (JP); Shoso Nishida, Hiroshima (JP); Daigo Saga, Hiroshima (JP); Takashi Harada, Hiroshima (JP)

(73) Assignee: THE JAPAN STEEL WORKS, LTD., Tokyo (JP)

( * ) Notice: Subject to any disclaimer, the term of this patent is extended or adjusted under 35 U.S.C. 154(b) by 48 days.

(21) Appl. No.: 16/078,500

(22) PCT Filed: Feb. 1, 2017

(86) PCT No.: PCT/JP2017/003576
§ 371 (c)(1),
(2) Date: Aug. 21, 2018

(87) PCT Pub. No.: WO2017/145680
PCT Pub. Date: Aug. 31, 2017

(65) Prior Publication Data
US 2019/0047195 A1   Feb. 14, 2019

(30) Foreign Application Priority Data

Feb. 22, 2016 (JP) ................................. 2016-030908
Feb. 22, 2016 (JP) ................................. 2016-030941

(51) Int. Cl.
*B29C 45/27* (2006.01)
*B29C 45/53* (2006.01)
(Continued)

(52) U.S. Cl.
CPC .......... *B29C 45/2703* (2013.01); *B29C 45/53* (2013.01); *B29C 45/54* (2013.01);
(Continued)

(58) Field of Classification Search
CPC ..... B29C 45/2703; B29C 45/53; B29C 45/54; B29C 45/586; B29C 45/542;
(Continued)

(56) References Cited

U.S. PATENT DOCUMENTS

| 5,306,129 A | 4/1994 | Ibar |
|---|---|---|
| 5,494,426 A | 2/1996 | Ibar |

(Continued)

FOREIGN PATENT DOCUMENTS

| CA | 2 476 712 A1 | 11/2004 |
|---|---|---|
| CN | 102818047 A | 12/2012 |

(Continued)

OTHER PUBLICATIONS

Communication dated Oct. 7, 2019 issued by the European Intellectual Property Office in counterpart European Application No. 17756122.2.

(Continued)

*Primary Examiner* — Nahida Sultana
(74) *Attorney, Agent, or Firm* — Sughrue Mion, PLLC

(57) ABSTRACT

[Problem] To provide an injection apparatus including a flow path switching mechanism that is simple in construction and low in cost.
[Solution] An injection apparatus (1) includes a plasticization device (2) for melting resin, a first and second plunger injection devices (4, 5) for measuring an amount of resin and injecting the resin, an injecting portion (8), and a flow path switching block (7) that connects the plasticization device, the first and second plunger injection devices and the injecting portion together. A first to fourth connecting flow
(Continued)

paths (23a, 23b) and a flow path switching valve (21) are provided in the flow path switching block (7). The plasticization device (2), the first plunger injection device (4), the injecting portion (8) and the second plunger injection device (5) are connected to the first to fourth connecting flow paths (23a, 23b), respectively. When the flow path switching valve (21) is switched to a first position, the first and second connecting flow paths (23a, 23b) communicate with each other, and the third and fourth connecting flow paths (23c, 23d) communicate with each other, whereas when the flow path switching valve (21) is switched to a second position, the first and fourth connecting flow paths (23a, 23d) communicate with each other and the first and third connecting flow paths (23b, 23c) communicate with each other.

12 Claims, 7 Drawing Sheets

(51) Int. Cl.
*B29C 45/54* (2006.01)
*B29C 45/58* (2006.01)
*B29C 45/00* (2006.01)

(52) U.S. Cl.
CPC .......... *B29C 45/542* (2013.01); *B29C 45/586* (2013.01); *B29C 45/0005* (2013.01); *B29C 2045/2706* (2013.01); *B29C 2045/545* (2013.01); *B29C 2045/547* (2013.01)

(58) Field of Classification Search
CPC ........ B29C 2045/547; B29C 2045/545; B29C 45/005; B29C 2045/2706; B29C 45/461; B29C 45/58
See application file for complete search history.

(56) References Cited

U.S. PATENT DOCUMENTS

| | | | | |
|---|---|---|---|---|
| 5,543,092 A * | 8/1996 | Ibar | ....................... | B29C 33/565 |
| | | | | 264/328.14 |
| 5,605,707 A | 2/1997 | Ibar | | |
| 5,650,104 A | 7/1997 | Ibar | | |
| 6,109,909 A * | 8/2000 | Morita | ................... | B29C 45/54 |
| | | | | 264/328.19 |
| 2014/0300019 A1* | 10/2014 | Moss | ..................... | B29C 45/03 |
| | | | | 264/40.7 |
| 2015/0048016 A1* | 2/2015 | Hartmann | ............... | B29C 48/03 |
| | | | | 210/232 |
| 2015/0239161 A1* | 8/2015 | Antunes | .................. | B29C 45/77 |
| | | | | 264/40.5 |
| 2016/0001474 A1* | 1/2016 | Nakatani | ................. | B29C 45/54 |
| | | | | 264/50 |
| 2016/0082635 A1* | 3/2016 | Kobayashi | ............. | B29C 45/34 |
| | | | | 264/257 |
| 2016/0257045 A1* | 9/2016 | Burton | ................ | B29C 45/0001 |
| 2017/0217066 A1* | 8/2017 | Galati | ................. | B29C 45/2703 |
| 2018/0178426 A1* | 6/2018 | Logan | ................. | B29C 45/2703 |

FOREIGN PATENT DOCUMENTS

| | | |
|---|---|---|
| EP | 0 571 334 A1 | 11/1993 |
| FR | 1 195 860 A | 11/1959 |
| JP | 47-39256 A | 12/1972 |
| JP | 51-124155 A | 10/1976 |
| JP | 7-24877 A | 1/1995 |
| JP | 7-32431 A | 2/1995 |
| JP | 9-503715 A | 4/1997 |
| JP | 2786243 B2 | 8/1998 |
| JP | 3062629 B2 | 7/2000 |
| JP | 2002-137270 A | 5/2002 |
| WO | 95/11122 A1 | 4/1995 |

OTHER PUBLICATIONS

Search Report dated Mar. 21, 2017, issued by the International Searching Authority in International Application No. PCT/JP2017/003576 (PCT/ISA/210).

Written Opinion dated Mar. 21, 2017, issued by the International Searching Authority in International Application No. PCT/JP2017/003576 (PCT/ISA/237).

Communication dated Mar. 28, 2018, issued by the Japanese Patent Office in counterpart Japanese Application No. 2016-030908.

Communication dated Jan. 6, 2020, from the State Intellectual Property Office of People's Republic of China in counterpart Application No. 201780012591.6.

* cited by examiner

Fig. 1A
Fig. 1B
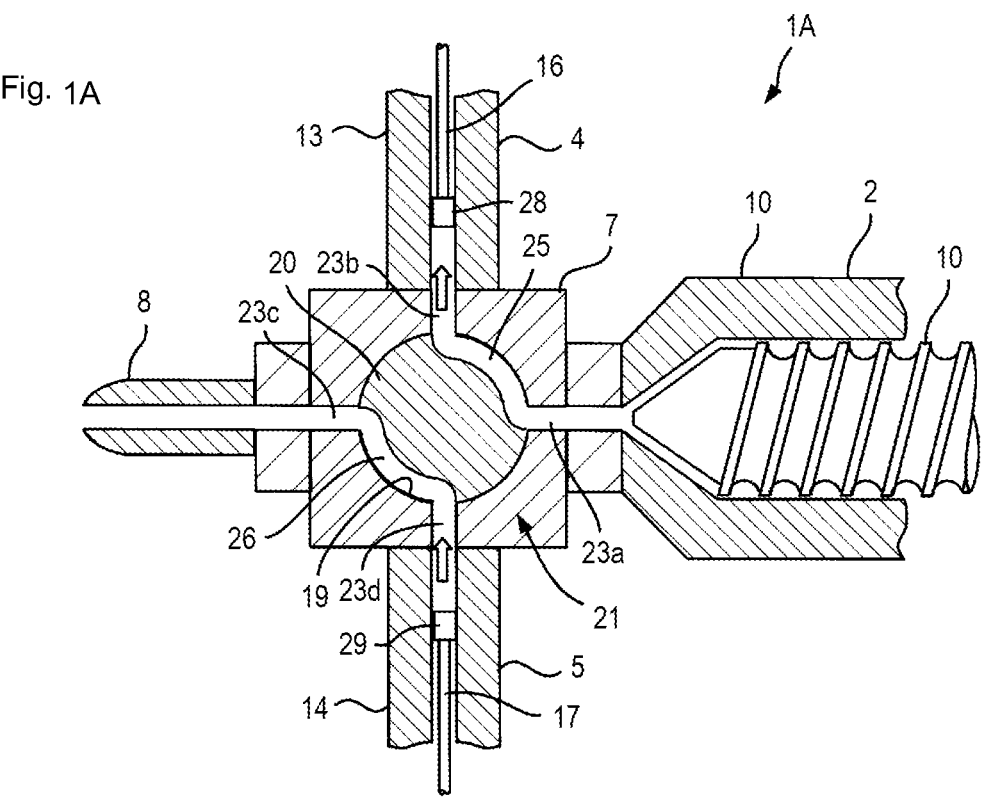
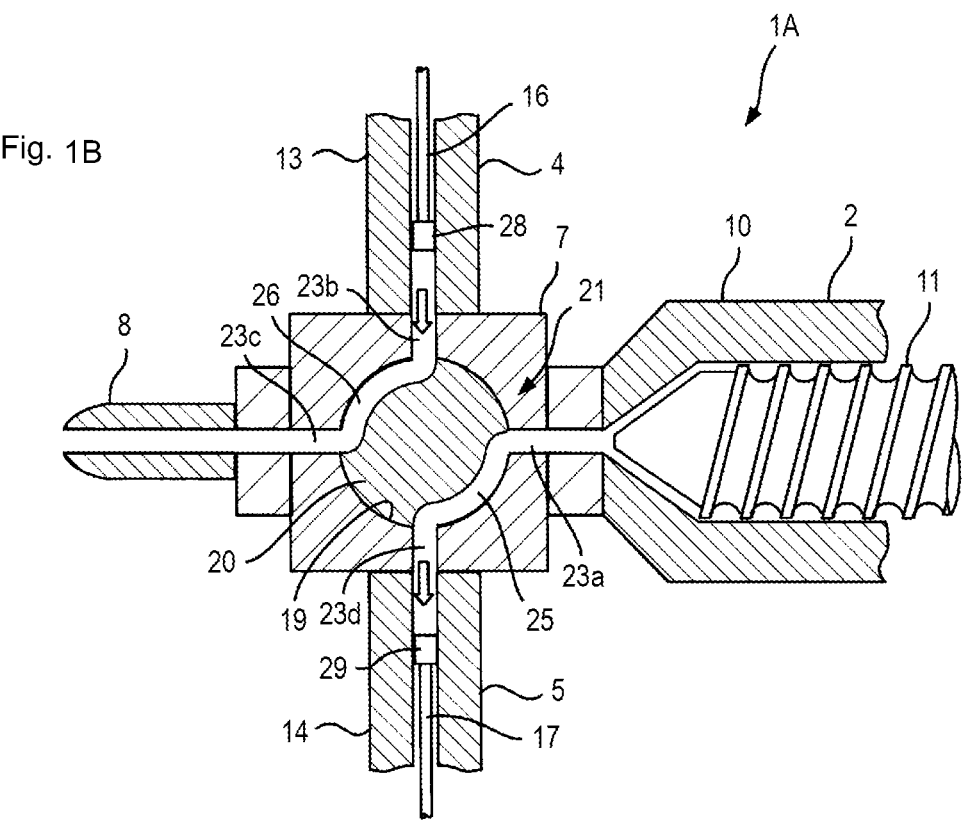

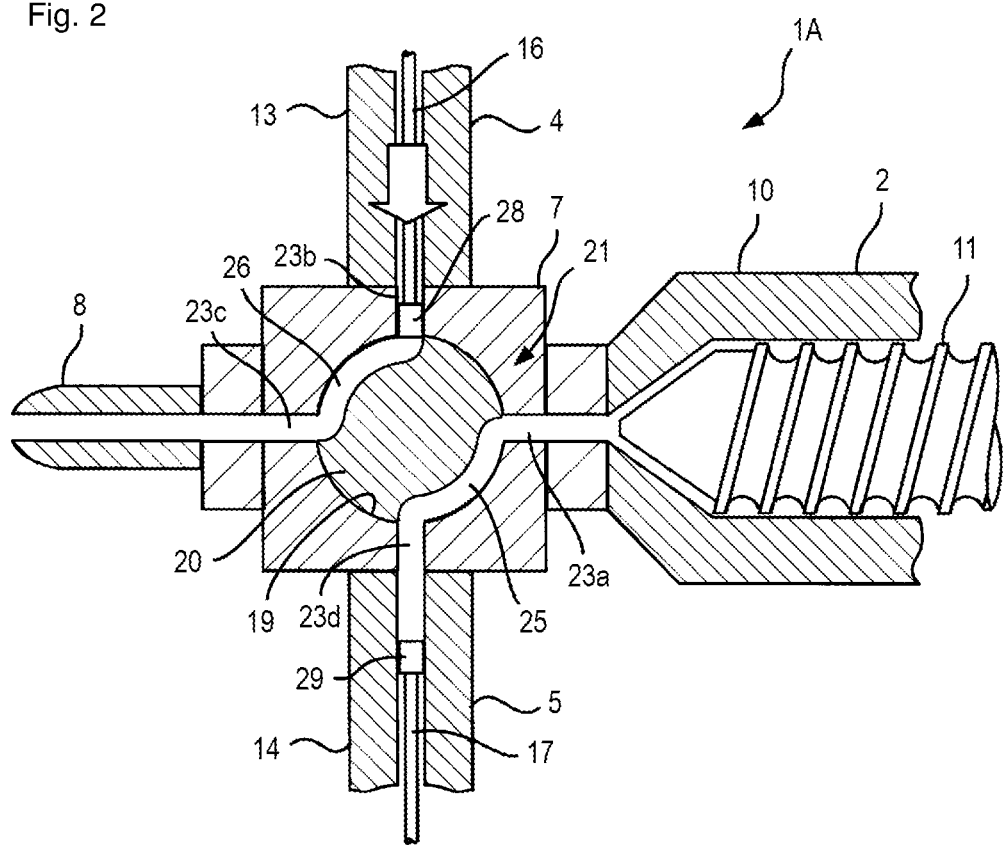

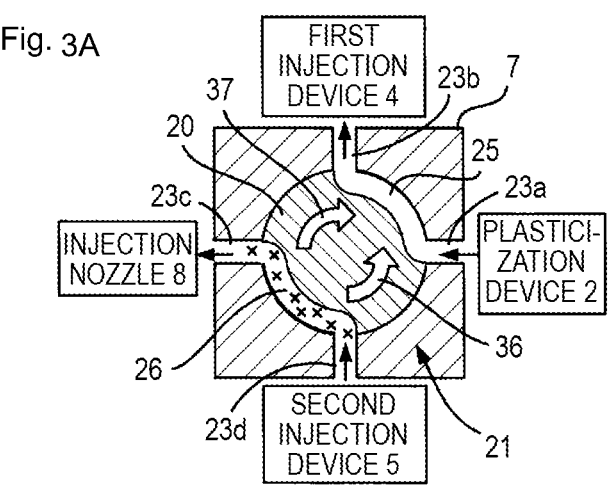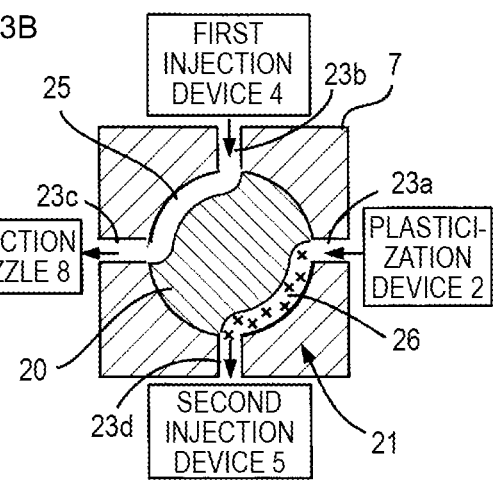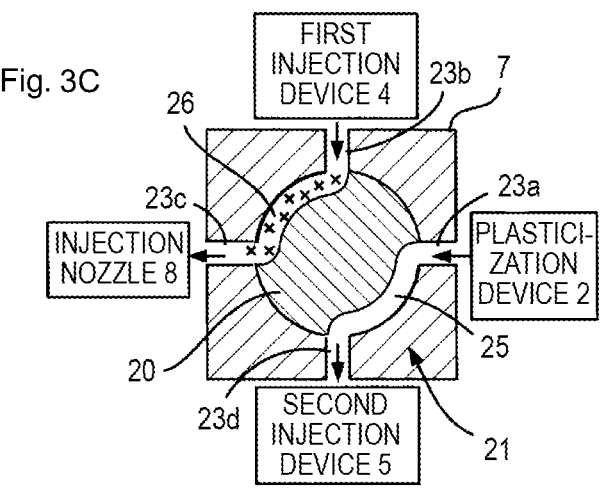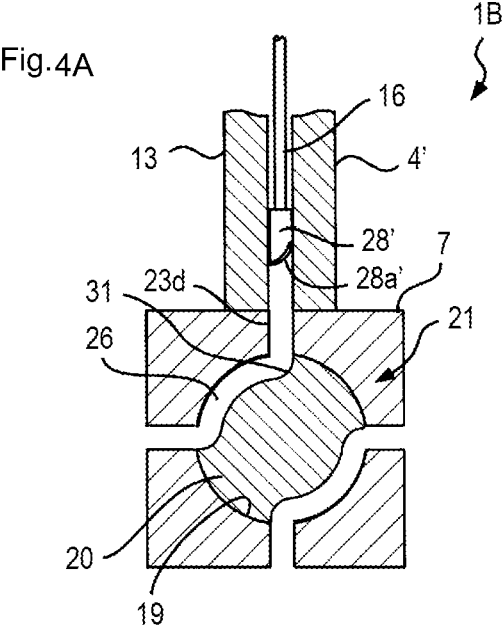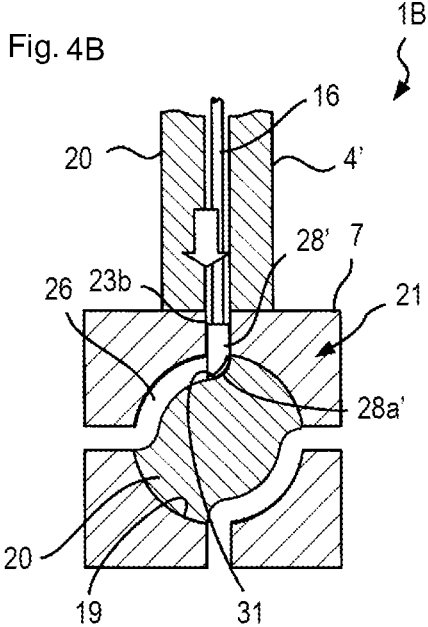

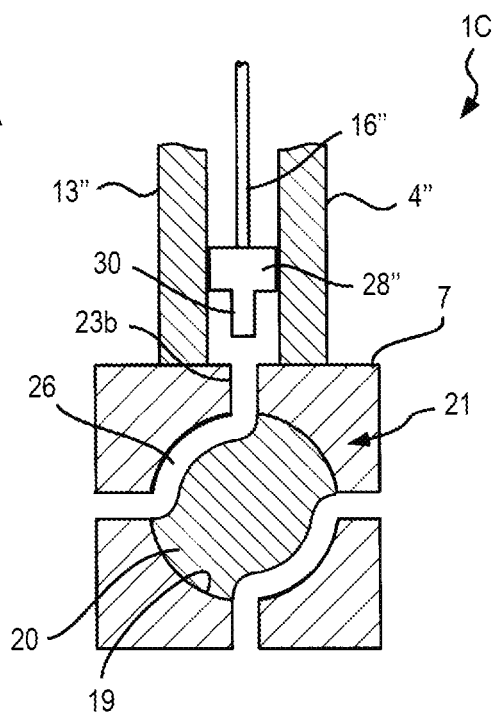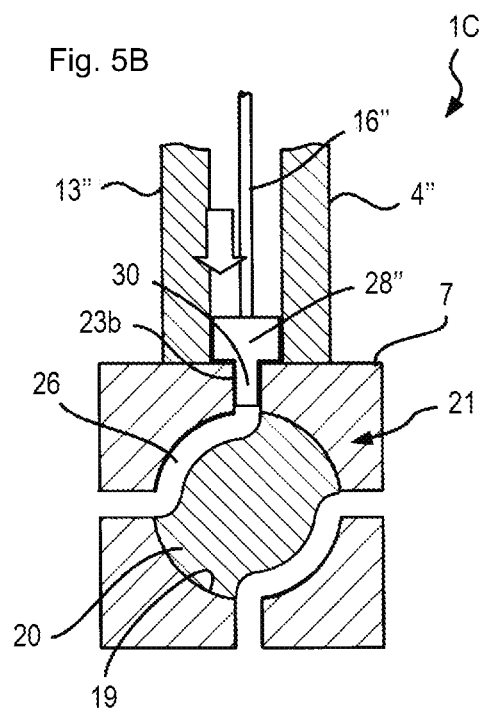

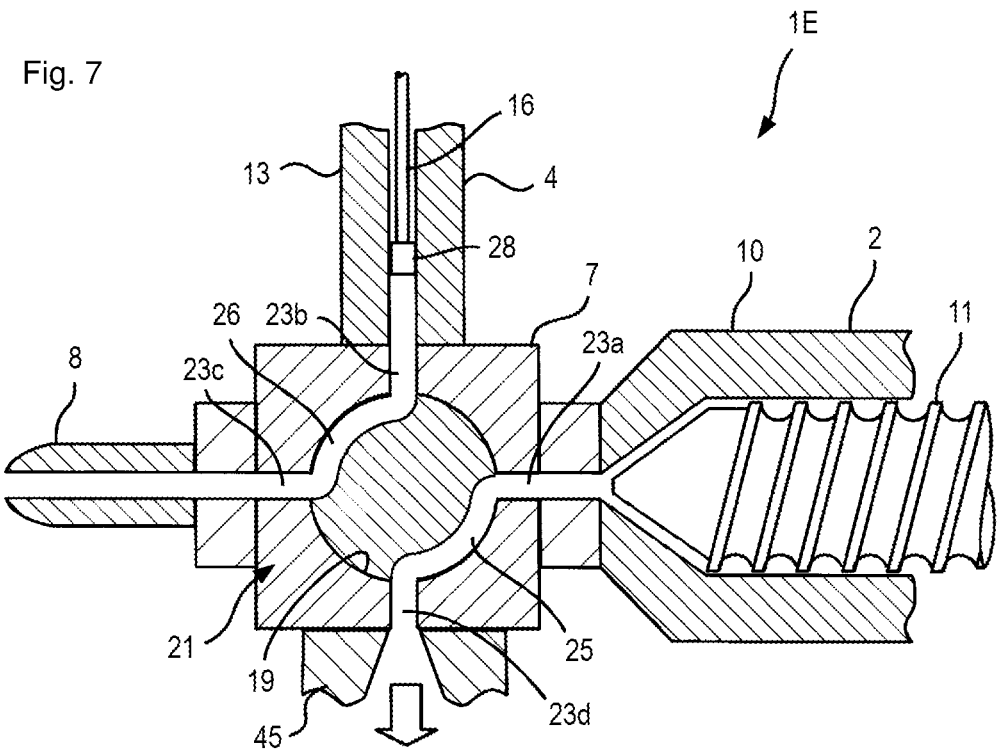
Fig. 7
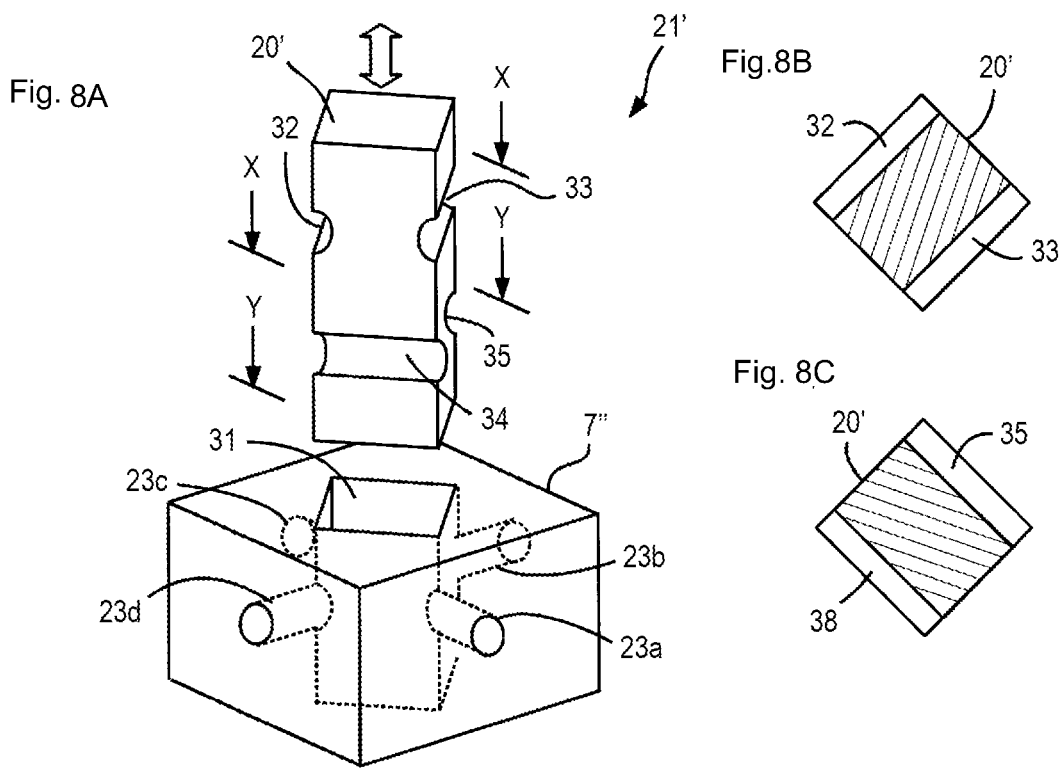
Fig. 8A
Fig. 8B
Fig. 8C

INJECTION DEVICE PROVIDED WITH FLOW PATH SWITCHING BLOCK

TECHNICAL FIELD

The present invention relates to an injection apparatus and more particularly to an injection apparatus including a plasticization device for melting resin, a plunger injection device for measuring an amount of melted resin and injecting the melted resin so measured, an injecting portion from which the resin is injected and a flow path switching mechanism for switching flow paths of resin.

BACKGROUND ART

Injection apparatuses are briefly divided into in-line screw injection apparatuses that include a screw and plunger injection apparatuses that include a plunger. In the in-line screw injection apparatuses, resin is plasticized and measured within the injection apparatus and is then injected therefrom. Namely, plasticization and injection are performed within the same injection apparatus. In contrast with the in-line screw injection apparatuses, the plunger injection apparatuses are divided in two types. Namely, the plunger injection apparatuses include plunger injection apparatuses that perform both plasticization and injection of resin therein and plunger injection apparatuses in which plasticization of resin is not performed therein but is executed by a plasticization device that is a separate device. In the latter plunger injection apparatuses, plasticization is performed by the separated plasticization device, resin that is plasticized by the plasticization device is measured in a plunger injection device to be injected therefrom. The plunger injection apparatuses of this type include a flow path switching mechanism for switching flow paths of resin so as to prevent not only leakage of resin from an injecting portion such as an injection nozzle when receiving the resin plasticized in the plasticization device for measurement but also a reversal flow of resin to the plasticization device when injecting the resin.

In the latter plunger injection apparatuses, since the plasticization device for plasticizing resin is provided separately from the plunger injection device, plasticization of resin can be executed continuously without having to be interrupted in an injection step. Namely, the plunger injection apparatuses of this type can provide a superior characteristic in which the quality of the melted resin can be maintained constant. There are various injection apparatuses made up of a combination of a plasticization device and a plunger injection device like those described above. For example, PTLs 1, 2 propose such injection apparatuses.

CITATION LIST

Patent Literature

PTL 1: Japanese Patent Publication No. 3062629
PTL 2: Japanese Patent Publication No. 2786243

An injection apparatus 51 proposed in PTL 1 includes, as shown in FIG. 9(A), a plasticization device 52 for plasticizing or melting resin, an accumulator device 53 for accumulating melted resin temporarily, and a plunger injection device 54 for injecting the melted resin. The plasticization device 52 is made up of a heating cylinder 56 and a screw 57, and resin supplied from a hopper 58 is melted and fed forwards. The accumulator device 53 is made up of a cylinder 60 and a plunger 61 that is driven by a predetermined driving device, so that the resin melted in the plasticization device 52 is supplied to the cylinder 60. The plunger injection device 54 is made up of an injection cylinder 63 and an injection plunger 64 that is driven by a predetermined driving device, and an injection nozzle 65 is provided at a distal end of the injection cylinder 63. Resin accumulated in the accumulator device 53 is supplied into an inside of the injection cylinder 63 via a flow path, and a first opening and closing valve 67 is interposed on this flow path. A second opening and closing valve 68 is interposed on a resin flow path inside the injection cylinder 63 that communicates with the injection nozzle 65. In this injection apparatus 51, the plasticization device 52 is designed to execute plasticization continuously without being interrupted in an injection step and a pressure holding step. This feature of the plasticization device 52 will be described. As a matter of convenience, the description will be started from a state where the first opening and closing valve 67 is closed and the resin flow path between the accumulator device 53 and the plunger injection device 54 is cut off. In this state, resin plasticized in the plasticization device 52 is supplied to the cylinder 60 of the accumulator device 53. The plunger 61 is withdrawn, and melted resin is accumulated at a distal end of the cylinder 60. Upon an accumulation of an amount of melted resin that is slightly smaller than an amount of resin that is required for one injection, the first opening and closing valve 67 is opened whereas the second opening and closing valve 68 is closed. Then, the plunger 61 is driven in an axial direction. As this occurs, the resin is supplied into the injection cylinder 63 of the plunger injection device 54, and the injection plunger 64 is withdrawn. As this occurs, since the plasticization device 52 keeps plasticization, melted resin from the plasticization device 52 is also supplied to the plunger injection device 54. When the plunger 61 reaches a stop position, that is, a thrusting completion position, this state is maintained for a while. Then, resin from the plasticization device 52 continues to be supplied into the plunger injection device 54. The first opening and closing valve 67 is closed when an amount of resin that the plunger injection device 54 requires is measured. The second opening and closing valve 68 is opened, and the injection plunger 64 is driven to inject the resin from the injection nozzle 65. Namely, an injection step is executed. A predetermined axial force is exerted on the injection plunger 64 until the pressure holding step is completed. Incidentally, resin that is melted in the plasticization device 52 is supplied to the accumulator device 53 to start an accumulation of resin immediately after the first opening and closing valve 67 is closed. This resin is to be used for the next injection. In this way, resin can be plasticized continuously in the plasticization device 52. Hereinafter, the same operation will continue.

An injection apparatus 71 that PTL 2 proposes includes, as shown in FIG. 9(B), a plasticization device 72 for plasticizing or melting resin and a first and second plunger injection devices 73, 74 for injecting melted resin. The plasticization device 72 includes a heating cylinder 76 and a screw 77 and melts resin supplied from a hopper 78. Then, the first and second plunger injection devices 73, 74 include injection cylinders 80, 81 and injection plungers 82, 83, respectively. The first and second plunger injection devices 73, 74 measure an amount of resin that the plasticization device 72 melts and inject the resin so measured. In this injection apparatus 71, a flow path switching valve 85 is provided at a distal end of the plasticization device 72. A flow path of resin from the plasticization device 72 branches off into two resin flow paths, that is, a first and second resin supply flow paths 86, 87 from the flow path switching valve 85, and the first and second resin supply flow paths 86, 87 connect to the first and second plunger injection devices 73, 74, respectively. One of the first and second resin supply flow paths 86, 87 communicates with the plasticization device 72 and the other is cut off according to a switching position of the flow path switching valve 85. In this injection apparatus 71, resin injected from the first and second plunger devices 73, 74 is injected from an injection nozzle 91 by way of a first and second injection flow paths 89, 90, respectively, and a first and second opening and closing valves 93, 94 are interposed on the first and second injection flow paths 89, 90, respectively. In this injection apparatus 71, too, the plasticization device 72 can continuously plasticize resin, and the injection apparatus 71 operates as follows. With the first opening and closing valve 93 closed, the plasticization device 72 and the first resin supply flow path 86 are caused to communicate with each other by operating the flow path switching valve 85. Then, resin plasticized and melted by the plasticization device 72 is supplied to the first plunger injection device 73, and the injection plunger 82 is withdrawn. When a predetermined amount is measured, the plasticization device 72 and the second resin supply flow path 87 are caused to communicate with each other by operating the flow path switching valve 85. In other words, the first resin supply flow path 86 is cut off. As this occurs, the second opening and closing valve 94 is closed in advance. Then, resin plasticized in the plasticization device 72 is supplied to the second injection device 74, and a measuring of an amount of resin is started in the second plunger injection device 74. The first opening and closing valve 93 is opened, and an injection step is executed by driving the injection plunger 82 in the first plunger injection device 73. A pressure holding step is executed for a predetermined length of time after the injection, and the first opening and closing valve 93 is closed. A required amount of resin is measured in the second plunger injection device 74 while the injection step and the pressure holding step are executed in the first plunger injection device 73. When the measuring of an amount of resin is completed, the plasticization device 72 and the first resin supply flow path 86 are caused to communicate with each other by operating the flow path switching valve 85. This starts a measuring of an amount of resin in the first plunger injection device 73. The second opening and closing valve 94 is opened, and an injection step is executed by driving the injection plunger 83 of the second plunger injection device 74. The second opening and closing valve 94 is closed after a pressure holding step is executed for the predetermined length of time. A required amount of resin for the first plunger injection device 73 is measured, whereupon the flow path switching valve 86 is switched. Hereinafter, the injection apparatus 71 will be operated in the same manner.

SUMMARY OF THE INVENTION

Technical Problem

In not only the injection apparatus 51 of PTL 1 but also the injection apparatus 71 of PTL 2, resin can be plasticized continuously in the plasticization devices 52, 72, and therefore, the quality of melted resin is maintained constant. Then, the plasticization step is not interrupted by the injection step and the pressure holding step, and therefore, a cycle time of a molding cycle can be shortened. Namely, it can be said that these injection apparatuses 51, 71 are superior. However, they seem to have problems to be solved. Firstly, as a problem to be solved in relation to these injection apparatuses 51, 71, the complex flow path switching mechanism for switching the flow paths of resin can be raised. In the injection apparatus 51, the two valves, that is, the first and second opening and closing valves 67, 68 are needed in the flow path switching mechanism, and the flow paths making up the flow path switching mechanism are formed complexly by holes formed in the cylinder 60 of the accumulator device 53 and the injection cylinder or the like. In the injection apparatus 71, the flow path switching mechanism needs the three valves, that is, the flow path switching valve 85 and the first and second opening and closing valves 93, 94, and the flow paths of the flow path switching mechanism are complexly made up of the first and second resin supply flow paths 86, 87 and the first and second injection flow paths 89, 90. Namely, the injection apparatus 71 has a problem in that the flow path switching mechanism is complex, leading to an increase in production costs. Then, in these flow path switching mechanisms, the frequency of failure becomes high since there are many moving portions involved due to the two or more valves being provided. Additionally, the maintenance costs are increased greatly. In melting and injecting resin containing reinforcing fibers, there is also caused a problem in that the reinforcing fibers are cut at many locations. In the case of the resin containing reinforcing fibers being used, reinforcing fibers situated near the valves are cut when the valves are opened and closed. In these injection apparatuses 51, 71, resin melted by the plasticization devices 52, 72 never fails to pass through the two valves when passing through the flow path switching mechanisms. Namely, as many as two locations exist where reinforcing fibers are cut. When the reinforcing fibers are cut to be short in length, the strength of a molded product is affected badly. There is another problem resulting from the complex structures of the flow path switching mechanisms. Although resin needs to be discharged out of the injection apparatus at the start of an operation where the quality of resin is not stable, the resin cannot be discharged easily due to the flow path switching mechanism being composed complexly. These injection apparatuses 51, 71 have a further problem in that part of resin remains therein for a long period of time. For example, in the injection apparatus 51, since the flow path between the plasticization device 52 and the plunger injection device 54 needs to be ensured, even though the plunger 61 is thrust to a frontmost position, the plunger 61 does not come into abutment with a distal end of the cylinder 60. Resin temporarily remains in a space defined therebetween. Additionally, in the injection apparatus 71, the first and second injection flow paths 89, 90 constitute by design flow paths where resin remains temporarily when it is not injected. The first and second resin supply flow paths 86, 87 constitute by design flow paths where resin remains temporarily. When resin remains therein, depending upon a type of resin, the resin gets carbonized or the quality of the resin gets deteriorated.

An object of the invention is to provide an injection apparatus that eliminates or solves the conventional drawbacks or problems that have been described above. Specifically speaking, an object of the invention is to provide an injection apparatus including a plasticization device and a plunger injection device in which a flow path switching mechanism for switching flow paths of resin in these devices has valves of as few as possible, and this makes the flow path switching mechanism simple in structure and difficult to fail, thereby making it possible to provide the injection apparatus at low cost, in which even in a case where the resin containing reinforcing fibers are used, few reinforcing fibers are cut, and in which resin is prevented from remaining therein for a long period of time, whereby a reduction in quality of the resin due to carbonization thereof can be prevented.

Solution to Problem

To achieve the object, according to the invention, an injection apparatus includes a plasticization device for melting resin, at least one plunger injection device for measuring an amount of resin melted in the plasticization device and injecting the resin measured, an injecting portion from which the resin is injected and a flow path switching block for connecting the plasticization device, the plunger injection device and the injection portion together. A first to fourth connecting flow paths and a flow path switching valve are provided in the flow path switching block. The plasticization device, the plunger injection device and the injecting portion are connected to the first to third connecting flow paths. Then, another plunger injection device or a discharging portion for discharging resin to an exterior portion is connected to the fourth connecting flow path. Switching the flow path switching valve to a first position causes the first connecting flow path and the second connecting flow path to communicate with each other and the third connecting flow path and the fourth connecting flow path to communicate with each other, and switching the flow path switching valve to a second position causes the first connecting flow path and the fourth connecting flow path to communicate with each other and the second connecting flow path and the third connecting flow path to communicate with each other.

That is, in order to achieve the above object, the invention according to claim 1 provides an injection apparatus including a flow path switching block, the injection apparatus comprising: a plasticization device configured to melt resin; at least one plunger injection device configured to measure an amount of resin melted in the plasticization device and to inject the melted resin; an injecting portion configured to inject the resin; and the flow path switching block connecting the plasticization device, the plunger injection device and the injecting portion, wherein the flow path switching block comprises a first to fourth connecting flow paths and one flow path switching valve, wherein the plasticization device is connected to the first connecting flow path, the plunger injection device is connected to the second connecting flow path, and the injecting portion is connected to the third connecting flow path, wherein when the flow path switching valve is switched to a first position, the first connecting flow path and the second connecting flow path communicate with each other, and the third connecting flow path and the fourth connecting flow path communicate with each other, and wherein when the flow path switching valve is switched to a second position, the first connecting flow path and the fourth connecting flow path communicate with each other, and the second connecting flow path and the third connecting flow path communicate with each other.

The invention according to claim 2 provides the injection apparatus including a flow path switching block according to claim 1, further comprising: an additional plunger injection device, wherein the additional plunger injection device is connected the fourth connecting flow path.

The invention according to claim 3 provides the injection apparatus including a flow path switching block according to claim 1, further comprising: a discharging portion configured to discharge resin to an exterior portion, wherein the discharging portion is connected to the fourth connecting flow path.

The invention according to claim 4 provides the injection apparatus including a flow path switching block according to any one of claims 1 to 3, wherein the flow path switching valve comprises a first and second in-valve flow paths that are two independent flow paths, and wherein the first and second in-valve flow paths are rotated within the flow path switching block to be switched to the first and second positions.

The invention according to claim 5 provides the injecting apparatus including a flow path switching block according to claim 4, wherein the flow path switching valve is configured to rotate such that: the first in-valve flow path communicates with the first connecting flow path either when the flow path switching valve is switched to the first position or when the flow path switching valve is switched to the second position; and the second in-valve flow path communicates with the third connecting flow path either when the flow path switching valve is switched to the first position or when the flow path switching valve is switched to the second position.

The invention according to claim 6 provides the injection apparatus including a flow path switching block according to claim 5, wherein the first in-valve flow path has a greater bore diameter than a bore diameter of the second in-valve flow path.

The invention according to claim 7 provides the injection apparatus including a flow path switching block according to any one of claims 1 to 6, wherein the second connecting flow path is configured to receive a distal end portion of a plunger of the plunger injection device at the time of injection.

The invention according to claim 8 provides the injection apparatus including a flow path switching block according to claim 7, wherein the distal end portion of the plunger of the plunger injection device is configured to enter a position where the distal end portion substantially reaches a valve body of a moving portion of the flow path switching valve.

The invention according to claim 9 provides the injection apparatus including a flow path switching block according to any one of claims 1 to 8, wherein the flow path switching block comprises a discharge valve provided on at least one of the first to fourth connecting flow paths, the discharge valve being configured to discharge the resin to an exterior portion when the discharge valve is operated.

Advantageous Effects of Invention

Thus, as has been described heretofore, the invention provides the injection apparatus including the plasticization device for melting resin, at least the plunger injection device for measuring an amount of resin melted in the plasticization device and injecting the melted resin so measured, the injecting portion from which resin is injected, and the flow path switching block that connects the plasticization device, the plunger injection device and the injecting portion together. Then, the flow path switching block includes the first to fourth connecting flow paths and the flow path switching valve. Then, the plasticization device is connected to the first connecting flow path, the plunger injection device is connected to the second connecting flow path, and the injecting portion is connected to the third connecting flow path, and when the flow path switching valve is switched to the first position, the first connecting flow path and the second connecting flow path communicate with each other, and the third connecting flow path and the fourth connecting flow path communicate with each other, whereas when the flow path switching valve is switched to the second position, the first connecting flow path and the fourth connecting flow path communicate with each other, and the second connecting flow path and the third connecting flow path communicate with each other. Consequently, in the injection apparatus of the invention, when the flow path switching valve is switched to the first position, resin melted in the plasticization device is supplied to the plunger injection device, whereas when the flow path switching valve is switched to the second position, resin can be injected from the injecting portion by driving the plunger injection device. Then, the flow path switching block that can switch the flow paths as described above includes only the single flow path switching valve, in other words, only one valve is provided in the flow path switching block. This makes the structure of the flow path switching block simple and hence makes it difficult for the flow path switching block to fail, thereby making it possible to provide the injection apparatus at low cost. Additionally, the injection apparatus has a superior advantage that even when the resin containing reinforcing fibers are used, since only one valve is provided in the flow path switching block, there are few reinforcing fibers that are cut by the valve. Then, there is almost no flow path in the flow path switching block where resin remains, and therefore, it is possible to prevent the deterioration of resin. According to another aspect of the invention, the injection apparatus includes an additional plunger injection device, and the additional plunger injection device is connected the fourth connecting flow path. Then, in the plunger injection device and the additional plunger injection device, while one plunger injection device is measuring an amount of resin from the plasticization device, the other plunger injection device can inject resin. Also, in the plunger injection device and the additional plunger injection device, while one plunger injection device is injecting resin, the other plunger injection device can measure the amount of resin from the plasticization device. That is, plasticization does not have to be interrupted in the injection step and the pressure holding step, and hence, the plasticization device can operate continuously. This can not only make the quality of resin uniform but also shorten the cycle time of the molding cycle. According to a further aspect of the invention, the injection apparatus includes the discharging portion for discharging resin to the exterior portion, and the discharging portion is connected to the fourth connecting flow path. In this aspect of the invention, although resin from the plasticization device is discharged from the discharging portion while the plunger injection device is driven to inject resin, it is ensured that the plasticization device can operate continuously. Namely, the quality of resin can be made uniform. According to an aspect of the invention, the flow path switching valve includes the first and second in-valve flow paths that are two independent flow paths and is rotated within the flow path switching block to be switched to the first and second positions. That is, the flow path switching valve is made up the flow path switching valve having the simple structure. Thus, the flow path switching valve fails little and can be provided at low cost. According to another aspect of the invention, the flow path switching valve rotates so that the first in-valve flow path communicates with the first connecting flow path whether the flow path switching valve is switched to either the first position or the second position and the second in-valve flow path communicates with the third connecting flow path whether the flow path switching valve is switched to either the first position or the second position. This enables fresh plasticized resin to flow from the plasticization device into the first in-valve flow path at all times. For example, when the additional plunger injection device is connected to the fourth connecting flow path, resin from the plasticization device is caused to flow to the plunger injection device or the additional plunger injection device by way of the first in-valve flow path and is then measured in amount at all times, and resin is prevented from staying in the first in-valve flow path, thereby making it possible to prevent the deterioration of resin certainly. Then, when the flow path switching valve is rotated, at least the first in-valve flow path is kept communicating with the plasticization device even during the switching of the flow path switching valve to either the first position or the second position. In this case, a buffer mitigating an increase in the pressure of resin can be ensured by an amount corresponding to a resin containing capacity of the first in-valve flow path, and therefore, even though the communication between the first connecting flow path and the second and fourth connecting flow path is cut off temporarily in association with a switching of the flow path switching valve, it is ensured that the plasticization device can continue to plasticize resin stably. According to a further aspect of the invention, the first in-valve flow path is formed to have a greater bore diameter than a bore diameter of the second in-valve flow path. In general, a pressure of resin injected from the plunger injection device is far greater than a pressure of resin supplied from the plasticization device. Then, a greater pressure is applied to the second in-valve flow path than to the first in-valve flow path. The flow path switching valve rotates, and therefore, it is clear that the flow path switching valve is a rotational body. In a case an unbalanced load is generated in the rotational body due to the different pressures, the rotational body tends to fail, and the service life thereof is also affected badly. However, with this aspect of the invention, the first in-valve flow path is formed to have the greater bore diameter than that of the second in-valve flow path, whereby the magnitude of the unbalanced load exerted on the flow path switching valve can be reduced. Thus, the flow path switching valve is prevented from being affected badly in terms of failure and service life thereof. According to an aspect of the invention, the second connecting flow path allows the distal end portion of the plunger of the plunger injection device to enter it at the time of injection. Then, resin in the second connecting flow path can also be injected, thereby making it possible to prevent resin from staying therein for a long period of time. This can prevent resin from being deteriorated due to carbonization. According to another aspect of the invention, the distal end portion of the plunger of the plunger injection device enters to a position where the distal end portion substantially reaches the valve body that is the moving portion making up the flow path switching valve. Then, an amount of resin remaining within the flow path switching valve can be reduced further, thereby making it possible to prevent resin from being deteriorated due to carbonization. According to a further aspect of the invention, the flow path switching block includes the discharge valve that is provided on at least one of the first to fourth connecting flow paths and then discharges resin to the exterior portion when the discharge valve is operated. Since the discharge valve is provided, it is possible to discharge resin whose quality is not stable easily when the plasticization device starts to operate. Additionally, resin can be discharged to an exterior portion when a maintenance service is carried out or at the time of emergency, and hence, the injection apparatus of the invention is superior in handling.

BRIEF DESCRIPTION OF DRAWINGS

FIGS. 1(A) and 1(B) show schematic drawings of an injection apparatus including a flow path switching block according to an embodiment of the invention, in which FIGS. 1(A), 1(B) are sectional views of the injection apparatus when a flow path switching valve of the flow path switching block is switched to a first and second positions, respectively.

FIG. 2 shows a schematic drawing of the injection apparatus including the flow path switching block according to the embodiment of the invention and is a sectional view of the injection apparatus in which an injection step is being executed by driving a plunger of a plunger injection device that makes up the injection apparatus.

FIGS. 3(A), 3(B), and 3(C) show drawings illustrating functions of the flow path switching block according to the embodiment of the invention, in which FIGS. 3(A) to 3(A), 3(B), and 3(C) are sectional views of the flow path switching block when the flow path switching valve is located in various switching positions.

FIGS. 4(A) and 4(B) show schematic drawings of part of an injection apparatus according to a second embodiment of the invention, in which FIGS. 4(A), and 4(B) are sectional views of a plunger injection device and a flow path switching block showing positions of a plunger before and after an injection.

FIGS. 5(A) and 5(B) show schematic drawings of part of an injection apparatus according to a third embodiment of the invention, in which FIGS. 5(A), and 5(B) are sectional views of a plunger injection device and a flow path switching block showing positions of a plunger before and after an injection.

FIGS. 6(A), 6(B) and 6(C) show drawings showing an injection apparatus according to a fourth embodiment of the invention, in which FIG. 6(A) is a sectional view showing the injection apparatus, and FIGS. 6(B), and 6(C) are sectional views showing one discharge valve provided in a flow path switching block.

FIG. 7 is a sectional view showing an injection apparatus according to a fifth embodiment of the invention.

FIGS. 8(A), 8(B) and 8(C) show drawings showing a flow path switching block according to a further embodiment of the invention, in which FIG. 8(A) is a perspective view of the flow path switching block, and FIGS. 8(B), and 8(C) are sectional views of the flow path switching block taken along a line X-X and a line Y-Y and viewed in directions indicated by arrows X, Y, respectively, shown in FIG. 8(A).

FIGS. 9(A) and 9(B) are drawings showing a conventional example, in which FIGS. 9(A), and 9(B) are sectional views showing injection apparatuses described in PTLs 1, 2, respectively.

DESCRIPTION OF EMBODIMENTS

Figure 6A:
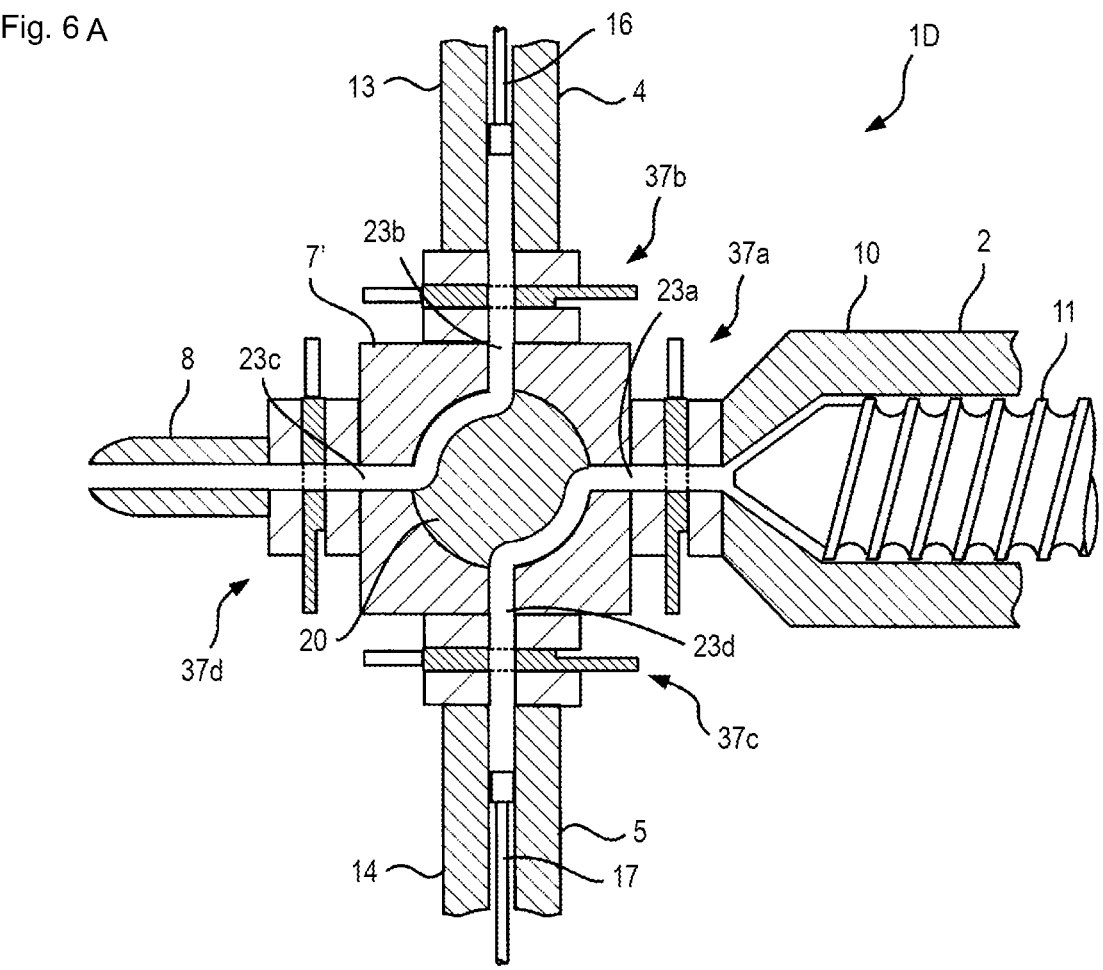

Hereinafter, embodiments of the invention will be described. An injection apparatus 1A according to a first embodiment of the invention includes, as shown in FIGS. 1(A) and 1(B), a plasticization device 2 for plasticizing, that is, melting resin, a first and second plunger injection devices 4, 5 for measuring an amount of melted resin and injecting the melted resin so measured, an injecting portion, that is, an injection nozzle 8 for injecting resin, and a flow path switching block 7 for connecting the plasticization device 2, the first and second plunger injection devices 4, 5 and the injection nozzle 8. As conventionally known, the plasticization device 2 includes a heating cylinder 10 and a screw 11 configured to rotate within the heating cylinder 10, and although not shown, a heater is provided on an outer circumferential surface of the heating cylinder 10 and a hoper is provided at a rear end portion of the heating cylinder 10. Consequently, when the heating cylinder 10 is heated by the heater, resin as a material is supplied into the heating cylinder 10 from the hopper and the screw 11 is rotated, the resin is plasticized, that is, melted and is then fed to a front of the plasticization device 2. The first and second plunger injection devices 4, 5 are made up of conventionally known plunger injection device and include injection cylinders 13, 14 and plungers 16, 17 that are driven in an axial direction within the injection cylinders 13, 14, respectively.

The flow path switching block 7 according to the embodiment characterizes the invention and constitutes a flow path switching mechanism for switching flow paths of resin. In this embodiment, the flow path switching block 7 is formed substantially into a cube. A bore 19 is opened vertically in the flow path switching block 7 from an upper surface of the cube. A valve body 20, which will be described next, is inserted rotatably in this bore 19, and a flow path switching valve 21 is made up of the flow path switching block 7, the bore 19 and the valve body 20. Incidentally, a through hole is opened in a center of each of four lateral surfaces that make up the cube to communicate with the bore 19. Namely, the through holes constitute a first to fourth connecting flow paths 23a, 23b, . . . . In the first to fourth connecting flow paths 23a, 23b, . . . , the plasticization device 2 is connected to the first connecting flow path 23a, the first and second plunger injection devices 4, 5 are connected to the second and fourth connecting flow paths 23b, 23d, respectively, and the injection nozzle 8 is connected to the connecting flow path 23c. Consequently, the plasticization device 2 and the injection nozzle 8 are disposed coaxially via the flow path switching block 7, and the first and second plunger injection devices 4, 5 are disposed coaxially and face each other via the flow path switching block 7. Since the devices are disposed as described above, an axis of the plasticization device 2 is at right angles to axes of the first and second plunger injection devices 4, 5, and the injection apparatus 1A is formed laterally symmetrical as a whole.

The valve body 20, which makes up the flow path switching valve 21 according to this embodiment, exhibits a cylindrical shape. Two grooves extending a predetermined length in a circumferential direction are formed on an outer circumferential surface of the valve body 20. These grooves are formed at the same height on the cylinder. One of the grooves is formed into an arc extending in an angular range of 0 degree to 90 degrees, while the other groove is formed into an arc extending in an angular rage of 180 degrees to 270 degrees, and both the grooves are formed in a predetermined depth on the outer circumferential surface of the valve body 20. The valve body 20 configured in the way described above is inserted into the bore 19, whereby a first in-valve flow path 25 is made up of one of the groove and the bore 19, while a second in-valve flow path 26 is made up of the other groove and the bore 19. The valve body 20 can rotate within the bore 19 as described above and can take two rotational positions, that is, a first position and a second position. The first to fourth connecting flow paths 23a, 23b, . . . are caused to communicate with each other or are cut off by the first and second in-valve flow paths 25, 26 as the valve body 20 takes the first and second positions.

In this embodiment, bore diameters of the injection cylinders 13, 14 of the first and second plunger injection devices 4, 5 are slightly smaller than bore diameters of the second and fourth connecting flow paths 23b, 23d. Consequently, when the plungers 16, 17 are driven in the axial direction, as shown in FIG. 2, plunger distal end portions 28, 29 move through distal end portions of the injection cylinders 13, 14 to enter the second and fourth connecting flow paths 23b, 23d and can reach substantially near the valve body 20. In this embodiment, since the plunger distal end portions 28, 29 move deep into the valve body 20, an amount of resin that remains within the flow path switching block 7 at the time of injection can become as small as possible, thereby making it possible to prevent the quality of resin from being modified due to staying therein for a long period of time.

A function of the injection apparatus 1A according to this embodiment will be described. Firstly, in the flow path switching block 7 according to this embodiment, the flow path switching valve 21 is switched to the first position as shown in FIG. 1(A). Then, the first and second connecting flow paths 23a, 23b communicate with each other by way of the first in-valve flow path 25. In other words, the plasticization device 2 and the first plunger injection device 4 communicate with each other. A predetermined axial force is exerted on the plunger 16 in advance. When the heating cylinder 10 is heated and the screw 11 is rotated in the plasticization device 2, resin melts and is then supplied from the plasticization device 2 to the first plunger injection device 4. The plunger 16 withdraws by virtue of a pressure exerted by the melted resin. Namely, a measuring of an amount of melted resin is executed. When a predetermined amount of melted resin is measured, the flow path switching valve 21 is switched to the second position as shown in FIG. 1(B). Then, the first connecting flow path 23a and the fourth connecting flow path 23d communicate with each other by way of the first in-valve flow path 25. In other words, the plasticization device 2 and the second plunger injection device 5 communicate with each other. The plasticization device 2 continues to operate to melt resin. Then, melted resin is supplied into the second plunger injection device 5. On the other hand, in this second position, the second connecting flow path 23b and the third connecting flow path 23c communicate with each other by way of the second in-valve flow path 26. In other words, the first plunger injection device 4 and the injection nozzle 8 communicate with each other. In the first plunger injection device 4, the plunger 16 is driven in the axial direction to inject the melted resin to load it in a mold, not shown. When the plunger 16 is driven completely, as shown in FIG. 2, the plunger distal end portion 28 moves through the injection cylinder 13 to enter the second connecting flow path 23b that is the flow path inside the flow path switching block 7. This can reduce an amount of resin remaining in the first plunger injection device 4 as low as possible. A predetermined axial force is exerted on the plunger 16 in a pressure holding step. When the resin loaded in the mold cools and sets, the mold is opened to remove a molded product therefrom, whereafter the mold is clamped again. In these injection step and pressure holding step, too, resin continues to be supplied from the plasticization device 2 to the second plunger injection device 5. Then, when a predetermined amount of resin is measured in the second plunger injection device 5, the flow path switching valve 21 is switched to the first position, as shown in FIG. 1(A). Then, the plasticization device 2 and the first plunger injection device 4 communicate with each other, and as described above, a measuring of an amount of resin starts in the first plunger injection device 4. Namely, the plasticization of resin is not interrupted. Now, the second plunger injection device 5 and the injection nozzle 8 also communicate with each other in this first position. The plunger 17 in the second plunger injection device 5 is driven in an axial direction to inject melted resin to load it in the mold, not shown. Hereinafter, molding is repeated in the same manner.

Incidentally, in the flow path switching block 7 according to this embodiment, specific attention is paid to the switching method of the flow path switching valve 21 or the switching directions thereof. FIG. 3(A) shows schematically the flow path switching block 7 in which the flow path switching valve 21 is switched to the first position, where resin supplied from the plasticization device 2 is sent into the first plunger injection device 4 by way of the first in-valve flow path 25, and resin that is to be injected from the second plunger injection device 5 is sent to the injection nozzle 8 by way of the second in-valve flow path 26 to be injected therefrom. The resin flowing inside the first in-valve flow path 25 is resin that has just been plasticized, while the resin flowing inside the second in-valve flow path 26 is the resin measured within the second plunger injection device 5, that is, the resin kept staying inside the second plunger injection device 5, and hence, a slight length of time has elapsed since it was plasticized. The valve body 20 can rotate in two directions denoted by reference numeral 36 and reference numeral 37, and the flow paths can be switched by the valve body 20 rotating in either of the two directions. When the valve body 20 rotates 90 degrees in the direction denoted by reference numeral 36, for example, as shown in FIG. 3(B), the plasticization device 2 and the second plunger injection device 5 communicate with each other, and the first plunger injection device 4 and the injection nozzle 8 communicate with each other. Thus, this rotational position may be referred to the second position. However, it is the second in-valve flow path 26 that causes then the plasticization device 2 to communicate with the second plunger injection device 5, and as has been described by reference to FIG. 3(A), the resin injected from the second plunger injection device 5, that is, the resin on which a slight length of time has elapsed since it was plasticized exists in the second in-valve flow path 26. Then, the resin is returned to the second plunger injection device 5 to stay there. When resin stays in the plunger injection device long, the quality of the resin may be deteriorated, which is not preferable. Then, in this embodiment, the valve body 20 is caused to rotate in the direction denoted by reference numeral 37. Then, the plasticization device 2 and the second plunger injection device 5 communicate with each other by way of the first in-valve flow path 25 where only resin that has just been plasticized exists, as shown in FIG. 3(C). Then, it is ensured that resin that is measured in the second plunger injection device 5 is fresh, and resin can be prevented from staying longer therein to be stale. Consequently, in this embodiment, this position is referred to as the second position. In this embodiment, the first in-valve flow path 25 is designed to communicate with the plasticization device 2 at all times irrespective of the flow path switching valve 21 being switched to the first position or the second position, while the second in-valve flow path 26 is designed to communicate with the injection nozzle 8 irrespective of the flow path switching valve 21 being switched to the first position or the second position, whereby resin is prevented from staying long in the flow paths.

In this way, in this embodiment, although the rotational method of the valve body 20 of the flow path switching valve 21 is determined, this provides another advantage. This will be described below. While the flow path switching valve 21 is switching the flow paths, the communications of the plasticization device 2 with the first and second plunger injection devices 4, 5 are temporarily cut off. In the case where the plasticization device 2 continues plasticization and continues supplying melted resin with the communications cut off, the pressure of resin increases quickly and drastically, affecting the plasticization of resin. However, when the valve body 20 is rotated as described above, even while the flow path switching valve 21 is switching the flow paths, at least the first in-valve flow path 25 is kept communicating with the plasticization device 2. This is because the first in-valve flow path 25 is the groove formed on the outer circumferential surface of the cylindrical valve body 20 and because this groove is kept connecting to the first connecting flow path 23*a* at all times even while the valve body 20 is rotating. Since the first in-valve flow path 25 is kept communicating with the plasticization device 2 in the way described above even while the flow path switching valve 21 is switching the flow paths, even though the communications of the plasticization device 2 with the first and second plunger injection devices 4, 5 are cut off temporarily, resin inside the first in-valve flow path 25 is compressed by an amount corresponding to a resin containing capacity of the first in-valve flow path 25 to thereby mitigate the increase of resin pressure. This prevents the continuous plasticization by the plasticization device 2 from being affected by an increase in resin pressure that would otherwise be a case.

Incidentally, in the case where the first in-valve flow path 25 communicates with the plasticization device 2 at all times and the second in-valve flow path 26 communicates with the injecting portion, that is, the injection nozzle 8 at all times, irrespective of the flow path switching valve 21 being switched to either of the first and second positions, bore diameters of the first and second in-valve flow paths 25, 26 may be changed. Specifically speaking, the bore diameter of the first in-valve flow path 25 is made greater than the bore diameter of the second in-valve flow path 26. This is because pressures of resins that are injected from the first and second plunger injection devices 4, 5 at the time of injection are quite greater than a pressure of resin that is supplied from the plasticization device 2. The difference in magnitude of the pressures results in an application of a greater internal pressure to the second in-valve flow path 26 than an internal pressure that is applied to the first in-valve flow path 25. Then, an unbalanced load is exerted on the flow path switching valve 21 or the valve body 20. This unbalanced load pushes the valve body 20 in a predetermined direction of the bore 19, whereby the flow path switching valve 21 tends to be deteriorated or fail easily. Consequently, to reduce the unbalanced load, the bore diameter of the first in-valve flow path 25 is made greater than the bore diameter of the second in-valve flow path 26.

The injection apparatus 1A according to this embodiment can be modified variously. FIGS. 4(A), 4(B) show a part of an injection apparatus 1B according to a second embodiment of the invention. Namely, a first plunger injection device 4' and a flow path switching block 7 of the injection apparatus 1B are shown in FIGS. 4(A), 4(B). A plasticization device 2, a second plunger injection device 5' and an injection nozzle 8 are also connected to the flow path switching block 7, however, these constituent members are omitted from the drawings. The first plunger injection device 4' of the injection apparatus 1B of the second embodiment differs from the first plunger injection device 4 according to the first embodiment. Specifically speaking, a plunger distal end portion 28' differs in shape from the plunger distal end portion 28 of the first plunger injection device 4, and a shape of an end face 28*a*' of the plunger distal end portion 28' coincides with a shape of a groove surface 31 of a valve body 20. In this embodiment, the plunger distal end portion 28' is allowed to enter an inside of the valve body 20 as shown in FIG. 4(B) when an injection is executed. This can reduce further an amount of resin that remains within the flow path switching valve 7 when an injection is executed. A plunger distal end portion 29' of the second plunger injection device 5' whose illustration is omitted is formed in the same way as the way in which the plunger distal end portion 28' of the first plunger injection device 4' is formed, and therefore, with the plunger distal end portion 29' of the second plunger injection device 5', an amount of resin remaining in the flow path switching block 7 can also be reduced further.

FIGS. 5(A), 5(B) show a part of an injection apparatus 1C according to a third embodiment of the invention. Although a plasticization device 2, a second plunger injection device 5" and an injection nozzle 8 are connected to three lateral surfaces of the flow path switching block 7 as with the first embodiment, these constituent members are omitted from the drawings, and only a first plunger injection device 4" and the flow path switching block 7 are shown in FIGS. 5(A), 5(B). The injection apparatus 1C according to the third embodiment has two characteristics. A first characteristic is that a bore diameter of an injection cylinder 13" is greater than a bore diameter of a second connecting flow path 23*b* in the flow path switching block 7. Consequently, an outside diameter of a plunger distal end portion 28" is increased so as to match the bore diameter of the injection cylinder 13". A second characteristic of this embodiment is that a projection 30 is provided at a distal end of the plunger distal end portion 28". The projection 30 has a cylindrical shape, and an outside diameter thereof is substantially equal to the bore diameter of the second connecting flow path 23*b*. Consequently, when a plunger 16" is driven as shown in FIG. 5(B) when an injection is executed, the projection 30 of the plunger distal end portion 28" can enter the second connecting flow path 23*b*. That is, with the third embodiment, too, an amount of resin that remains within the flow path switching block 7 at the time of injection can be reduced. Since the second plunger injection device 5' whose illustration is omitted is formed in the same way as the way in which the first plunger injection device 4" is formed, with the second plunger injection device 5", an amount of resin that remains within the flow path switching block 7 at the time of injection can be reduced.

Figure 6B:
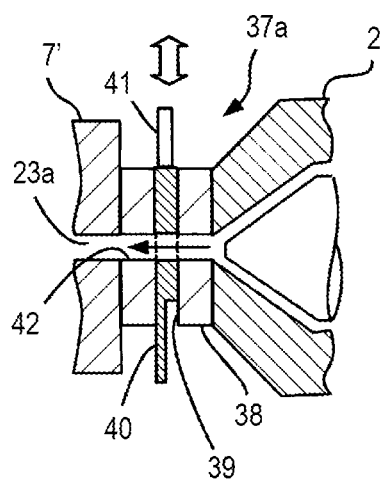
Figure 6C:
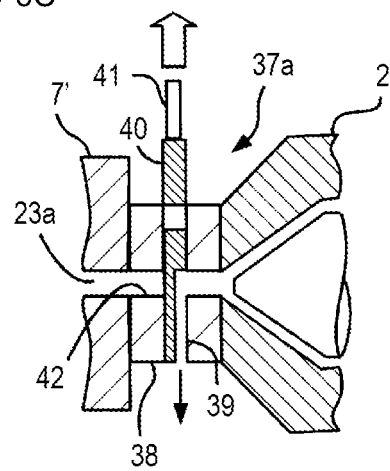
Figure 9A:
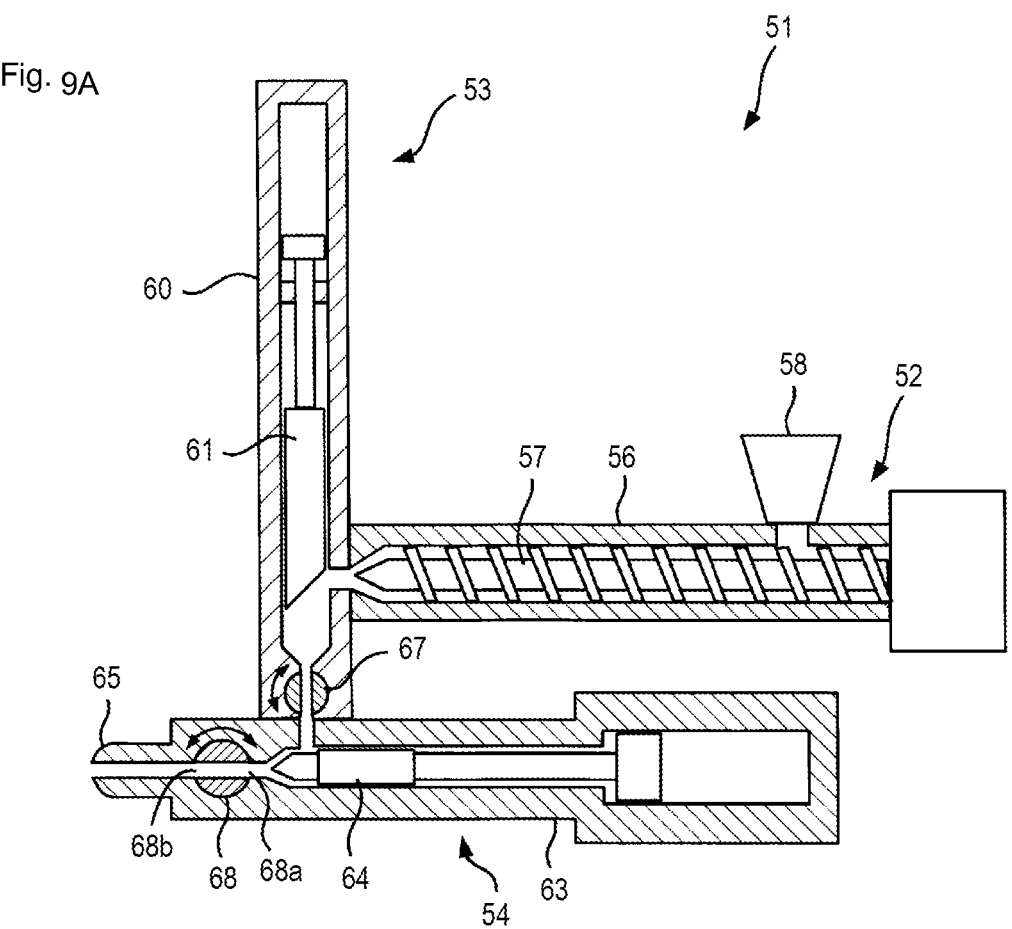
Figure 9B:
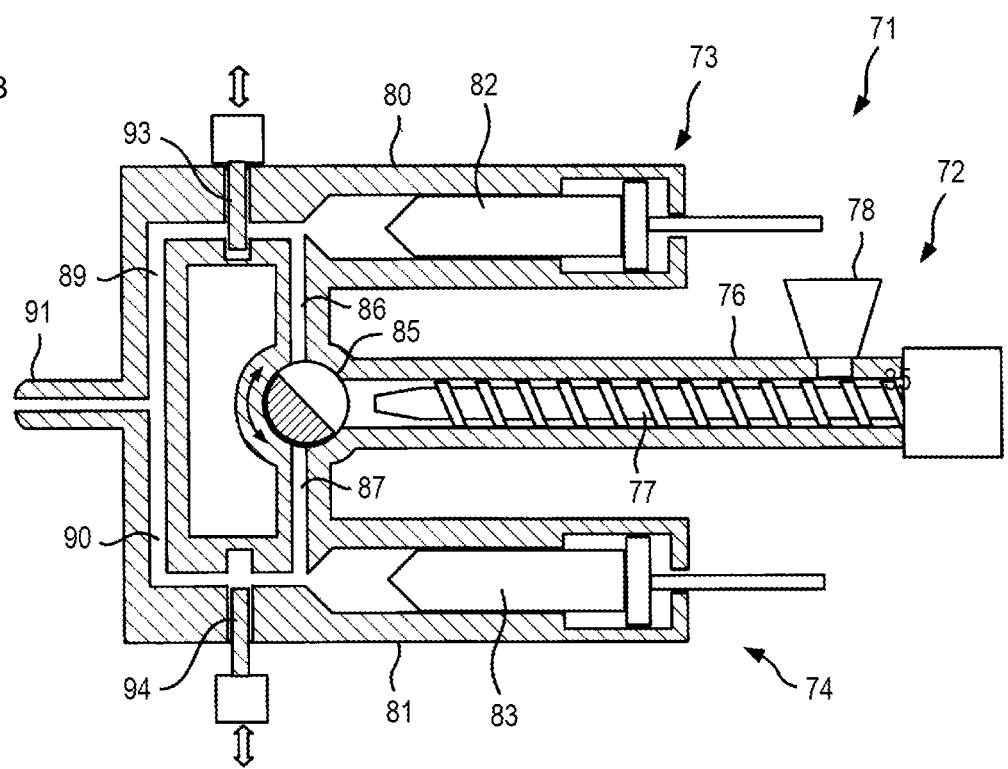

As a modified example made to the injection apparatus 1A of the first embodiment, a mechanism for discharging resin can be added. This discharging mechanism is intended to discharge resin when the quality of resin that is plasticized at the start of an operation is not stable, when a maintenance service is carried out, or at the time of emergency. FIG. 6(A) shows an injection device 4D including a resin discharging mechanism according to a fourth embodiment. A flow path switching block 7' including discharging valves 37*a*, 37*b*, . . . is provided in an injection apparatus 1D of this embodiment. In this fourth embodiment, the discharge valves 37*a*, 37*b*, . . . are provided, respectively, in all of first to fourth connecting flow paths 23*a*, 23*b*, . . . . In this fourth embodiment, structures of these discharge valves 37*a*, 37*b*, . . . are identical, and therefore, only the discharge valve 37*a* provided in the first connecting flow path 23*a* will be described. As shown in FIG. 6(B), the discharge valve 37*a* includes a block body 38 and a valve body 40. A resin flow path 42, which makes up a part of the first connecting flow path 23*a*, and a through hole 39, which intersects the resin flow path 42 at right angles, are formed in the block body 38. The valve body 40 having a predetermined shape is inserted into the through hole 39, so that the valve body 40 is driven up and down in the through hole 39 when an operating portion 41 is operated by a driving mechanism, not shown. When the valve body 40 is located in a position shown in FIG. 6(B), the resin flow path 42, that is, the first connecting flow path 23a communicates with a plasticization device 2 and the flow path switching block 7' so that resin flows from the plasticization device 2 to the flow path switching block 7'. However, when the valve body 40 is driven to a position shown in FIG. 6(C) by operating the operating portion 41 when the injection apparatus 1D is started to operate, when a maintenance service is carried out, or at the time of emergency, the resin flow path 42, that is, the first connecting flow path 23a is closed, whereby resin from the plasticization device is discharged to an exterior portion by way of the through hole 39. As described above, in this embodiment, the discharge valves 37a, 37b, . . . are provided in all of the first to fourth connecting flow paths 23a, 23b, . . . , so that resin can be discharged from any of the discharge valves 37a, 37b, . . . . However, the four discharge valves 37a, 37b, . . . do not necessarily have to be provided altogether, and hence, the object of discharging resin can be achieved only by one discharge valve. The structure of the discharge valves 37a, 37b, . . . does not have to be limited to the structure described above, and hence, any structure may be adopted, provided that it enables resin to be discharged to an exterior portion.

In the embodiments, it is described that the two plunger injection devices, that is, the first and second plunger injection devices 4, 5 are provided in the injection apparatus 1A, 1B, . . . and that resin can be injected alternately from the first and second plunger injection devices. However, a configuration may be adopted in which an injection apparatus includes only one plunger injection device that is mounted on a flow path switching block 7 according to this embodiment. FIG. 7 shows such an injection apparatus or an injection apparatus 1E according to a fifth embodiment. In the injection apparatus 1E, a plasticization device 2, a first plunger injection device 4 and an injection nozzle 8 are connected, respectively, to a first to third connecting flow paths 23a, 23b, 23c in the flow path switching block 7 according to this embodiment. However, a discharging portion 45 for discharging resin to an exterior portion is connected to a fourth connecting flow path 23d. Consequently, as shown in FIG. 7, when a flow path switching valve 21 takes a second position, resin supplied from the plasticization device 2 is discharged from the discharging portion 45. Although resin is wasted as it is discharged, since the plasticization device 2 can be operated continuously, when the flow path switching valve 21 is switched to a first position to supply resin from the plasticization device 2 to the first plunger injection device 4, it is ensured that resin whose quality is constant can be supplied at all times.

FIG. 8 shows a modified flow path switching block 7" according to a further embodiment. In this flow path switching block 7", a valve body 20' has a substantially rectangular parallelepiped shape and is provided so as to slide smoothly into a rectangular parallelepiped hole 31 opened in the flow path switching block 7". Four grooves 32, 33, 34, 35 are formed on the valve body 20'. The groove 32 and the groove 33 are formed at the same height, while the groove 34 and the groove 35 are formed at the same height. Flow paths can be switched by sliding the valve body 20' to switch it to a first position where the grooves 32, 33 are aligned with a first to fourth connecting flow paths 23a, 23b, . . . and a second position where the grooves 34, 35 are aligned with the first to fourth connecting flow paths 23a, 23b, . . . . As is understood by those skilled in the art to which the invention pertains, the invention can be carried out using this flow path switching block 7".

There is another modified example. For example, in the embodiments, the bore diameters of the injection cylinders 13, 14 of the first and second plunger injection devices 4, 5 are described as being slightly smaller than the bore diameters of the second and fourth connecting flow paths 23b, 23d. However, the bore diameters of the injection cylinders 13, 14 may be equal to the bore diameters of the second and fourth connecting flow paths 23b, 23d. In this case, the bores of the injection cylinders 13, 14 continue smoothly to the second and fourth connecting flow paths 23b, 23d of the flow path switching block 7. Then, the plunger distal end portions 28, 29 can reach the insides of the second and fourth connecting flow paths 23b, 23d smoothly. There is a further modified example. For example, the plunger distal end portions 28, 29 of the plungers 16, 17 do not necessarily have to reach the insides of the second and fourth connecting flow paths 23b, 23d. When the bore diameters of the injection cylinders 13, 14 are made greater, the plunger distal end portions 28, 29 cannot reach the insides of the second and fourth connecting flow paths 23b, 23d. However, this provides an advantage that a great amount of resin can be injected even with a short injection stroke of the plungers 16, 17. There is another modified example. In the embodiments that have been described heretofore, the injecting portion is described as being made up of the injection nozzle 8. However, it is possible to adopt a T die for extruding resin into a film-like configuration as the injecting portion.

REFERENCE SIGNS LIST 1A, 1B Injection apparatus
2 Plasticization device
4 First plunger injection device
5 Second plunger injection device
7 Flow path switching block
8 Injection nozzle
10 Heating cylinder
11 Screw
13, 14 Injection cylinder
16, 17 Plunger
19 Bore
20 Valve body
21 Flow path switching valve
23a, 23b, 23c, 23d First to fourth connecting flow paths
25 First in-valve flow path
26 Second in-valve flow path
28, 29 Plunger distal end portion
37a, 37b, 37c, 37d Discharging valve

The invention claimed is:

1. An injection apparatus including a flow path switching block, the injection apparatus comprising:
   a plasticization device configured to melt resin;
   at least one plunger injection device configured to measure an amount of resin melted in the plasticization device and to inject the melted resin;
   an injecting portion configured to inject the resin; and
   the flow path switching block connecting the plasticization device, the at least one plunger injection device and the injecting portion,
   wherein the flow path switching block comprises a first connecting flow path, a second connecting flow path, a third connecting flow path, a fourth connecting flow path and one flow path switching valve,
   wherein the plasticization device is connected to the first connecting flow path, the at least one plunger injection device is connected to the second connecting flow path, and the injecting portion is connected to the third connecting flow path,
wherein when the flow path switching valve is switched to a first position, the first connecting flow path and the second connecting flow path communicate with each other, and the third connecting flow path and the fourth connecting flow path communicate with each other,
wherein when the flow path switching valve is switched to a second position, the first connecting flow path and the fourth connecting flow path communicate with each other, and the second connecting flow path and the third connecting flow path communicate with each other, and
wherein the second connecting flow path is configured to receive a distal end portion of a plunger of the at least one plunger injection device at the time of injection.

2. The injection apparatus including a flow path switching block according to claim 1, further comprising:
an additional plunger injection device,
wherein the additional plunger injection device is connected the fourth connecting flow path.

3. The injection apparatus including a flow path switching block according to claim 1, further comprising:
a discharging portion configured to discharge resin to an exterior portion,
wherein the discharging portion is connected to the fourth connecting flow path.

4. The injection apparatus including a flow path switching block according to claim 1,
wherein the flow path switching valve comprises a first and second in-valve flow paths that are two independent flow paths, and
wherein the first and second in-valve flow paths are rotated within the flow path switching block to be switched to the first and second positions.

5. The injecting apparatus including a flow path switching block according to claim 4,
wherein the flow path switching valve is configured to rotate such that:
the first in-valve flow path communicates with the first connecting flow path either when the flow path switching valve is switched to the first position or when the flow path switching valve is switched to the second position; and
the second in-valve flow path communicates with the third connecting flow path either when the flow path switching valve is switched to the first position or when the flow path switching valve is switched to the second position.

6. The injection apparatus including a flow path switching block according to claim 5, wherein the first in-valve flow path has a greater bore diameter than a bore diameter of the second in-valve flow path.

7. The injection apparatus including a flow path switching block according to claim 1, wherein the distal end portion of the plunger of the at least one plunger injection device is configured to enter a position where the distal end portion substantially reaches a valve body of a moving portion of the flow path switching valve.

8. The injection apparatus including a flow path switching block according to claim 1, wherein the flow path switching block comprises a discharge valve provided on at least one of the first to fourth connecting flow paths, the discharge valve being configured to discharge the resin to an exterior portion when the discharge valve is operated.

9. An injection apparatus including a flow path switching block, the injection apparatus comprising:
a plasticization device configured to melt resin;
at least one plunger injection device configured to measure an amount of resin melted in the plasticization device and to inject the melted resin;
an injecting portion configured to inject the resin; and
the flow path switching block connecting the plasticization device, the at least one plunger injection device and the injecting portion,
wherein the flow path switching block comprises a first connecting flow path, a second connecting flow path, a third connecting flow path, a fourth connecting flow path and one flow path switching valve,
wherein the plasticization device is connected to the first connecting flow path, the at least one plunger injection device is connected to the second connecting flow path, and the injecting portion is connected to the third connecting flow path,
wherein when the flow path switching valve is switched to a first position, the first connecting flow path and the second connecting flow path communicate with each other, and the third connecting flow path and the fourth connecting flow path communicate with each other,
wherein when the flow path switching valve is switched to a second position, the first connecting flow path and the fourth connecting flow path communicate with each other, and the second connecting flow path and the third connecting flow path communicate with each other, and
wherein the first in-valve flow path has a greater bore diameter than a bore diameter of the second in-valve flow path.

10. An injection apparatus including a flow path switching block, the injection apparatus comprising:
a plasticization device configured to melt resin;
at least one plunger injection device configured to measure an amount of resin melted in the plasticization device and to inject the melted resin;
an injecting portion configured to inject the resin; and
the flow path switching block connecting the plasticization device, the at least one plunger injection device and the injecting portion,
wherein the flow path switching block comprises a first connecting flow path, a second connecting flow path, a third connecting flow path, a fourth connecting flow path and one flow path switching valve, the flow path switching valve comprising:
a bore, the first connecting flow path, the second connecting flow path, the third connecting flow path, and the fourth connecting flow path being communicated with the bore,
a valve body rotatable within the bore and having two grooves extending in a circumferential direction on an outer circumferential surface thereof; and
a first in-valve flow path and a second in-valve flow path that are two independent flow paths, the first in-valve flow path being made up of one of the two grooves and the bore, the second in-valve flow path being made up of the other of the two grooves and the bore,
wherein the plasticization device is connected to the first connecting flow path, the at least one plunger injection device is connected to the second connecting flow path, and the injecting portion is connected to the third connecting flow path,
wherein when the flow path switching valve is switched to a first position, the first connecting flow path and the second connecting flow path communicate with each other via the first in-valve flow path, and the third connecting flow path and the fourth connecting flow path communicate with each other via the second in-valve flow path, and wherein when the flow path switching valve is switched to a second position, the first connecting flow path and the fourth connecting flow path communicate with each other via the first in-valve flow path, and the second connecting flow path and the third connecting flow path communicate with each other via the second in-valve flow path.

11. The injection apparatus including a flow path switching block according to claim 10, wherein the plasticization device is configured to melt the resin containing reinforcing fibers, wherein the at least one plunger injection device is configured to measure the amount of the resin containing the reinforcing fibers melted in the plasticization device and to inject the melted resin containing the reinforcing fibers, wherein the injecting portion is configured to inject the resin containing the reinforcing fibers, and wherein the injection apparatus further comprises a discharging portion configured to discharge the resin containing the reinforcing fibers to an exterior portion, the discharging portion being connected to the fourth connecting flow path.

12. The injection apparatus including a flow path switching block according to claim 10, wherein the first in-valve flow path has a greater bore diameter than a bore diameter of the second in-valve flow path.

* * * * *